(12) United States Patent
Chung et al.

(10) Patent No.: US 12,386,347 B2
(45) Date of Patent: *Aug. 12, 2025

(54) REMOTE CONTROL UNIT HAVING ACTIVE FEEDBACK

(71) Applicant: Textron Innovations Inc., Providence, RI (US)

(72) Inventors: Stephen Yibum Chung, Keller, TX (US); Russell C. Peters, Fort Worth, TX (US); Andrew Vincent Louis, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/391,877

(22) Filed: Dec. 21, 2023

(65) Prior Publication Data

US 2024/0160207 A1 May 16, 2024

Related U.S. Application Data

(60) Continuation of application No. 18/061,530, filed on Dec. 5, 2022, now Pat. No. 11,899,451, which is a
(Continued)

(51) Int. Cl.
| | |
|---|---|
| G05D 1/00 | (2024.01) |
| B64C 29/00 | (2006.01) |
| G05D 1/222 | (2024.01) |
| G05D 1/652 | (2024.01) |
| B64U 10/14 | (2023.01) |
| B64U 30/10 | (2023.01) |
| B64U 30/20 | (2023.01) |

(Continued)

(52) U.S. Cl.
CPC ........ *G05D 1/005* (2013.01); *B64C 29/0033* (2013.01); *G05D 1/102* (2013.01); *G05D 1/222* (2024.01); *G05D 1/652* (2024.01); *B64U 10/14* (2023.01); *B64U 30/10* (2023.01); *B64U 30/20* (2023.01); *B64U 30/293* (2023.01); *B64U 50/19* (2023.01); *B64U 2101/20* (2023.01); *B64U 2201/10* (2023.01); *B64U 2201/20* (2023.01)

(58) Field of Classification Search
CPC ....... B64C 39/024; B64C 13/16; B64C 13/20; B64C 29/00; B64C 29/0016
See application file for complete search history.

(56) References Cited

U.S. PATENT DOCUMENTS 9,108,729 B2 * 8/2015 Duggan ................. B64C 19/00
9,412,278 B1 * 8/2016 Gong ................... G08G 5/0013
(Continued)

*Primary Examiner* — Benjamin P Lee
(74) *Attorney, Agent, or Firm* — Akona IP PC

(57) ABSTRACT

In one embodiment, a remote controller for a vehicle includes at least one control element for controlling operation of at least one aspect of the vehicle when the vehicle is in a remote-control mode; an actuator connected the at least one control element for controlling a position of the at least one control element when the vehicle is in an autonomous operations mode; and a processing system for receiving a first control signal from the vehicle indicative of a state of operation of the vehicle. In operation, the processing system generates a second control signal to the actuator to cause the actuator to control a position of the control element such that it corresponds to and indicates the state of operation of the vehicle.

20 Claims, 6 Drawing Sheets

Related U.S. Application Data division of application No. 16/284,164, filed on Feb. 25, 2019, now Pat. No. 11,543,819.

(51) Int. Cl.
*B64U 30/293* (2023.01)
*B64U 50/19* (2023.01)
*B64U 101/20* (2023.01)

(56) References Cited

U.S. PATENT DOCUMENTS

| | | | |
|---|---|---|---|
| 11,077,937 B1* | 8/2021 | Bruell | B64D 37/04 |
| 11,353,890 B1* | 6/2022 | Auerbach | G05D 1/0061 |
| 11,358,730 B1* | 6/2022 | Freiheit | B64C 13/503 |
| 11,417,224 B1* | 8/2022 | Freiheit | B64C 29/00 |
| 11,454,990 B1* | 9/2022 | List | G05D 1/0022 |
| 2005/0004723 A1* | 1/2005 | Duggan | B64C 19/00 701/13 |
| 2013/0099048 A1* | 4/2013 | Fisher | B64U 10/25 244/12.1 |
| 2016/0031554 A1* | 2/2016 | Eshkenazy | B64U 10/14 244/6 |
| 2016/0236790 A1* | 8/2016 | Knapp | B64C 11/44 |
| 2016/0297520 A1* | 10/2016 | Sada-Salinas | B64U 30/10 |
| 2017/0108866 A1* | 4/2017 | Quinn | G05D 1/0011 |
| 2017/0308100 A1* | 10/2017 | Iskrev | G05D 1/0676 |
| 2018/0002011 A1* | 1/2018 | McCullough | B64U 30/10 |
| 2018/0002012 A1* | 1/2018 | McCullough | B64U 10/16 |
| 2018/0002013 A1* | 1/2018 | McCullough | B64U 50/19 |
| 2018/0002014 A1* | 1/2018 | McCullough | B64C 29/02 |
| 2019/0302761 A1* | 10/2019 | Huang | G05D 1/0044 |
| 2020/0132841 A1* | 4/2020 | Lovering | B64D 31/06 |
| 2020/0140079 A1* | 5/2020 | Campbell | B64C 29/0033 |
| 2020/0354049 A1* | 11/2020 | Noppel | B64U 70/83 |
| 2021/0053670 A1* | 2/2021 | Landry | B64U 10/20 |
| 2021/0061462 A1* | 3/2021 | Johnson | G07C 5/008 |
| 2021/0089134 A1* | 3/2021 | Tran | G08G 5/0021 |
| 2021/0120176 A1* | 4/2021 | Wang | H04N 23/687 |
| 2021/0183255 A1* | 6/2021 | Van Tulder | G08G 5/0013 |
| 2021/0316847 A1* | 10/2021 | Predonu | B64U 10/20 |
| 2021/0362851 A1* | 11/2021 | McCullough | B64C 5/02 |
| 2021/0362857 A1* | 11/2021 | McCullough | B64C 11/306 |
| 2022/0147066 A1* | 5/2022 | Choi | G08G 5/003 |
| 2022/0169366 A1* | 6/2022 | Truong | B64U 10/20 |
| 2022/0317706 A1* | 10/2022 | Moy | G05D 1/0011 |

* cited by examiner

REMOTE CONTROL UNIT HAVING ACTIVE FEEDBACK

CROSS-REFERENCE TO RELATED APPLICATIONS

This Application is a continuation (and claims benefit of priority under 35 U.S.C. § 121 of U.S. application Ser. No. 18/061,530, filed Dec. 5, 2022, entitled "REMOTE CONTROL UNIT HAVING ACTIVE FEEDBACK," which is a divisional (and claims benefit of priority under 35 U.S.C. § 121 of U.S. application Ser. No. 16/284,164 filed Feb. 25, 2019, entitled "REMOTE CONTROL UNIT HAVING ACTIVE FEEDBACK," of which both disclosures are considered part of (and are incorporated by reference in) the disclosure of this application.

TECHNICAL FIELD

This disclosure relates in general to the field of aircraft and, more particularly, though not exclusively, a remote-control unit for an aircraft having active feedback.

BACKGROUND

Unlike fixed-wing aircraft, vertical takeoff and landing ("VTOL") aircraft do not require runways. Instead, VTOL aircraft are capable of taking off, hovering, and landing vertically. One example of VTOL aircraft is a helicopter, which is a rotorcraft having one or more rotors that provide vertical lift and forward thrust to the aircraft. Helicopter rotors not only enable hovering and vertical takeoff and vertical landing, but also enable forward, aftward, and lateral flight. These attributes make helicopters highly versatile for use in congested, isolated or remote areas where fixed-wing aircraft may be unable to take off and land. Helicopters, however, typically lack the forward airspeed of fixed-wing aircraft.

A tiltrotor is another example of a VTOL aircraft. Tiltrotor aircraft utilize tiltable rotor systems that may be transitioned between a forward thrust orientation and a vertical lift orientation. The rotor systems are tiltable relative to one or more fixed wings such that the associated proprotors have a generally horizontal plane of rotation for vertical takeoff, hovering, and vertical landing and a generally vertical plane of rotation for forward flight, or airplane mode, in which the fixed wing or wings provide lift. In this manner, tiltrotor aircraft combine the vertical lift capability of a helicopter with the speed and range of fixed-wing aircraft.

VTOL aircraft may be manned or unmanned. An unmanned aerial vehicle ("UAV"), also commonly referred to as a "drone," is an aircraft without a human pilot aboard. UAVs may be used to perform a variety of tasks, including filming, package delivery, surveillance, and other applications. A UAV typically forms a part of an unmanned aircraft system ("UAS") that includes the UAV, a ground-based, or remote, controller, and a system of communication between the vehicle and controller.

SUMMARY

In one embodiment, a remote controller for a vehicle includes at least one control element for controlling operation of at least one aspect of the vehicle when the vehicle is in a remote-control mode; an actuator connected the at least one control element for controlling a position of the at least one control element when the vehicle is in an autonomous operations mode; and a processing system for receiving a first control signal from the vehicle indicative of a state of operation of the vehicle. In operation, the processing system generates a second control signal to the actuator to cause the actuator to control a position of the control element such that it corresponds to and indicates the state of operation of the vehicle.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
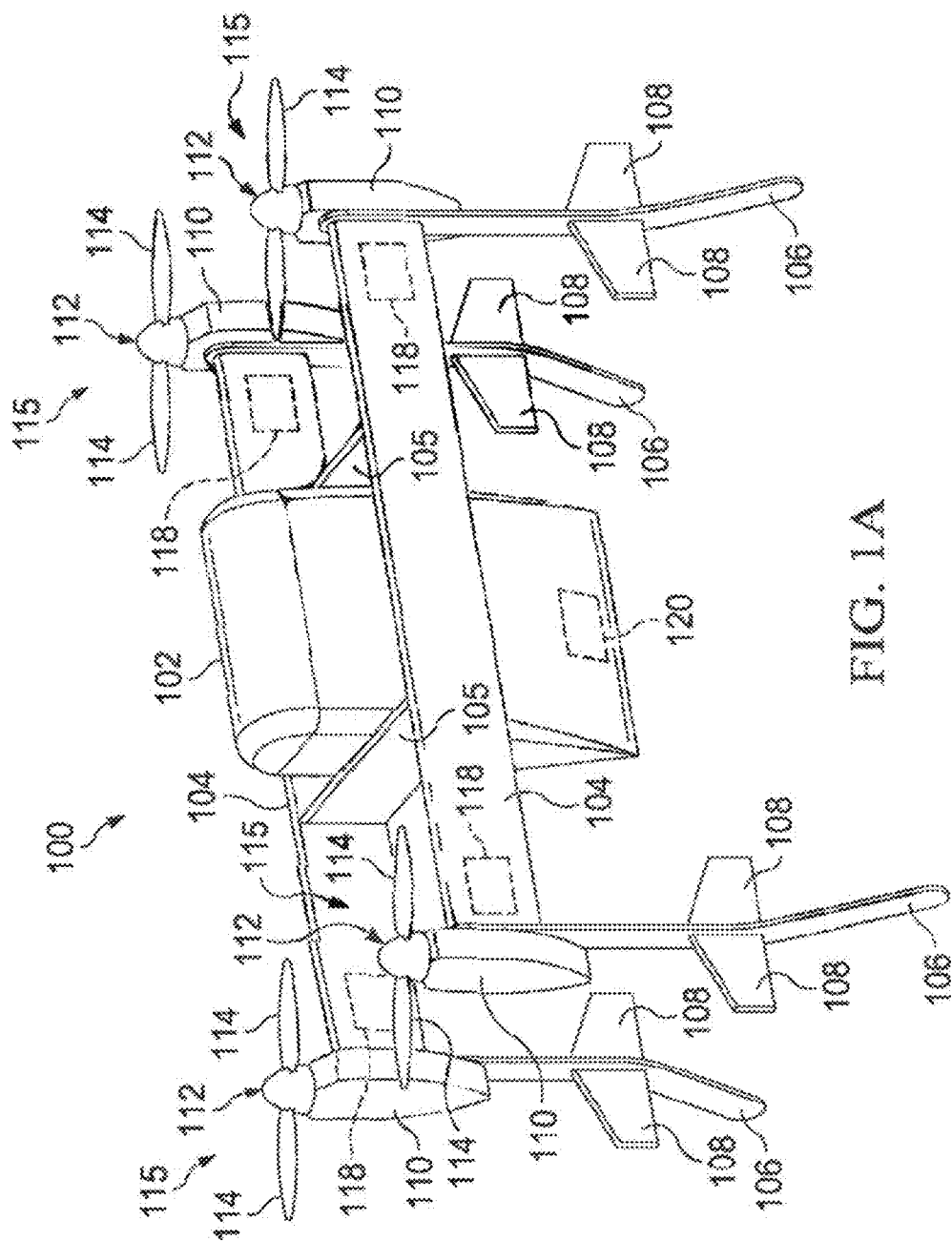
FIGS. 1A-1B are simplified diagrams of an example aircraft, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that is farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1B:
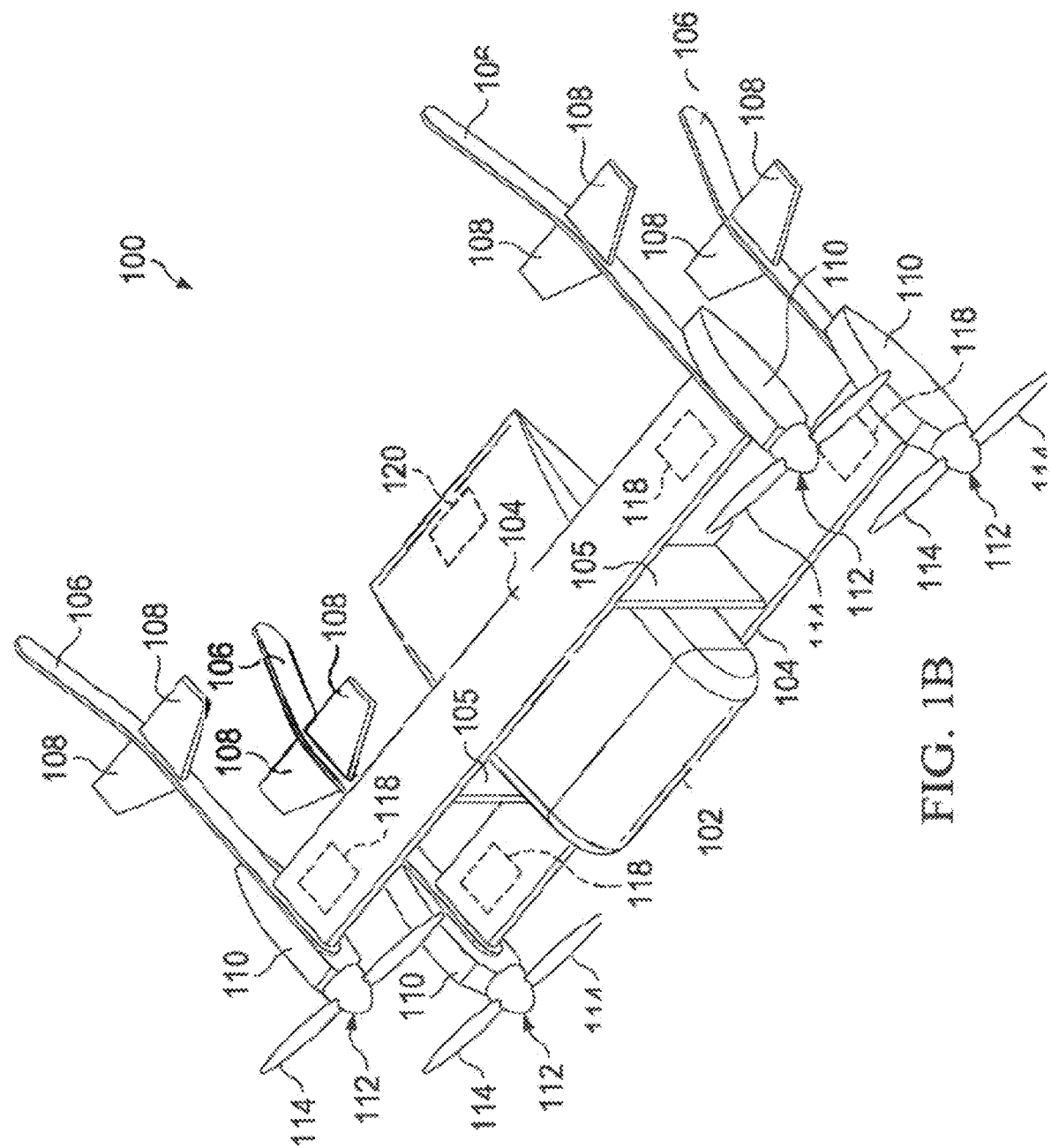

Referring now to FIGS. 1A-1B, FIGS. 1A-1B illustrate example embodiments of an example aircraft 100, which in these examples is generally configured as a vertical takeoff and landing ("VTOL") aircraft. More specifically, aircraft 100 may be an autonomous pod transport ("APT") convertible drone-type aircraft (discussed in further detail below) that is operable in different flight modes including a helicopter mode (as shown in FIG. 1A) and an airplane mode (as shown in FIG. 1B). In helicopter mode, aircraft 100 may be capable of various flight maneuvers including, but not limited to, vertical takeoff from and landing to one or more landing zone(s), hover, and/or sideward and rearward mobility or flight. In airplane mode, aircraft 100 may be capable of forward flight maneuvers. Additionally, since aircraft 100 is a convertible aircraft, it is also operable in a conversion, or transition, mode when transitioning between the helicopter and airplane modes.

As previously noted, unlike fixed-wing aircraft, VTOL aircraft do not require runways. Instead, VTOL aircraft are capable of taking off, hovering, and landing vertically. As also noted above, helicopters and tiltrotors are examples of VTOL aircraft. Yet another type of VTOL aircraft is commonly referred to as a "tail-sitter" aircraft. As the name implies, a tail-sitter aircraft takes off and lands on its tail, but tilts horizontally for forward flight. As illustrated in the embodiments of FIGS. 1A-1B, aircraft 100 is configured as a tail-sitter aircraft. Being a drone-type aircraft, aircraft 100 is configured for remote control and operation. Additionally, at least in some embodiments, aircraft 100 may be fully autonomous and self-directed via a predetermined or preprogrammed location-based guidance system (e.g., global positioning system (GPS), coordinate-based location, street address, etc.).

In at least one embodiment, aircraft 100 may include a cargo pod 102 that functions as the fuselage, wings 104, vertical supports 105 disposed between the wings 104, tail booms 106, horizontal stabilizers 108 extending from each tail boom 106, and a plurality of pylons 110 each comprising a rotor system 112 having a plurality of rotor blades 114. Each combination of a pylon 110 and its associated rotor system 112 comprising rotor blades 114 may be referred to herein as a propulsion assembly 115. Aircraft 100 may also include plurality of aircraft sensors 118 and a control system 120. Wings 104 comprise a substantially parallel, double-wing (sometimes referred to as "biplane") configuration that provides lift to the aircraft 100 during forward flight (e.g., as shown in FIG. 1B) while also maintaining a smaller footprint of the aircraft 100 when the aircraft 100 is on the ground. Vertical supports 105 are disposed on each side of the cargo pod 102 and affixed between the wings 104 to provide structure and support to the wings 104. The cargo pod 102 is generally positioned between the wings 104 and the vertical supports 105. In the embodiment shown, the cargo pod 102 is affixed to the vertical supports 105. However, in other embodiments, the cargo pod 102 may be affixed to the wings 104 or both the wings 104 and vertical supports 105. Additionally, while two vertical supports 105 are shown, in some embodiments, aircraft 100 may comprise more vertical supports 105 depending on the configuration of the aircraft 100.

Tail booms 106 are disposed on the outboard ends of each wing 104. The tail booms 106 are curved at the aft ends to provide stabilization to the aircraft 100 during forward flight in a manner substantially similar as other tail surfaces known in the art, while also doubling as a landing gear for the aircraft 100. As such the curved ends of the tail booms 106 may provide a wider base for landing gear uses. Each tail boom 106 also comprises a pair of horizontal stabilizers 108 coupled to each of an inner and outer surface of the tail boom 106. The horizontal stabilizers 108 function to provide stabilization to the aircraft 100 during forward flight in a manner substantially similar as horizontal stabilizers known in the art. Pylons 110 are disposed on outboard sides of each tail boom 106 proximate the outboard end of each wing 104. Each pylon 110 comprises a selectively rotatable rotor system 112 having a plurality of rotor blades 114 coupled thereto. In the embodiment shown, each rotor system 112 is driven by an associated electric motor (not shown) within each pylon 110. However, in other embodiments, the rotor systems 112 may be driven by a combustion engines or auxiliary power unit through a plurality of interconnect driveshafts and/or auxiliary gearboxes, which may be housed within any portion of an aircraft (e.g., within a pylon, fuselage, combinations thereof, or the like). Furthermore, since aircraft 100 functions as a convertible aircraft, the rotational speeds of each rotor system 112 may be selectively controlled to orient aircraft 100 in the various flight modes.

In various embodiments, control system 120 may include one or more processor(s), memory element(s), network connectivity device(s), storage, input/output (I/O) device(s), combinations thereof, or the like to facilitate operations of each propulsion assembly 115 and/or other electronic systems of aircraft 100. In various embodiments, operation of each propulsion assembly 115 may include controlling the rotational speed of rotor systems 112, adjusting thrust vectors of rotor systems 112, and the like to facilitate vertical lift operations, forward thrust operations, transition operations, combinations thereof, or the like for aircraft 100. In some embodiments, feedback may be received by control system 120 (e.g., via each propulsion assembly 115, one or more sensors 118, etc.) to facilitate or augment various operations of aircraft 100. In various embodiments, sensors 118 may include, but not be limited to, positioning sensors, attitude sensors, speed sensors, environmental sensors, fuel sensors, temperature sensors, location sensors, combinations thereof, or the like.

When aircraft 100 is in a helicopter mode position, rotor systems 112 may provide a vertical lifting thrust for aircraft 100, which may enable hover flight operations to be performed by aircraft 100. When aircraft 100 is in an airplane mode position, rotor systems 112 may provide a forward thrust and a lifting force may be supplied by wings 104.

Example embodiments associated with an aircraft remote control system providing active feedback are described below with more particular reference to the remaining FIGURES. It should be appreciated that example aircraft 100 of FIGS. 1A-1B is merely illustrative of a variety of aircraft in which a remote-control system providing active feedback may be used in accordance with embodiments of the present disclosure. Other aircraft in which remote control systems providing active feedback may be used can include, for example, fixed wing airplanes, hybrid aircraft, unmanned aircraft, a variety of helicopter configurations, and drones, among other examples.

Figure 2:
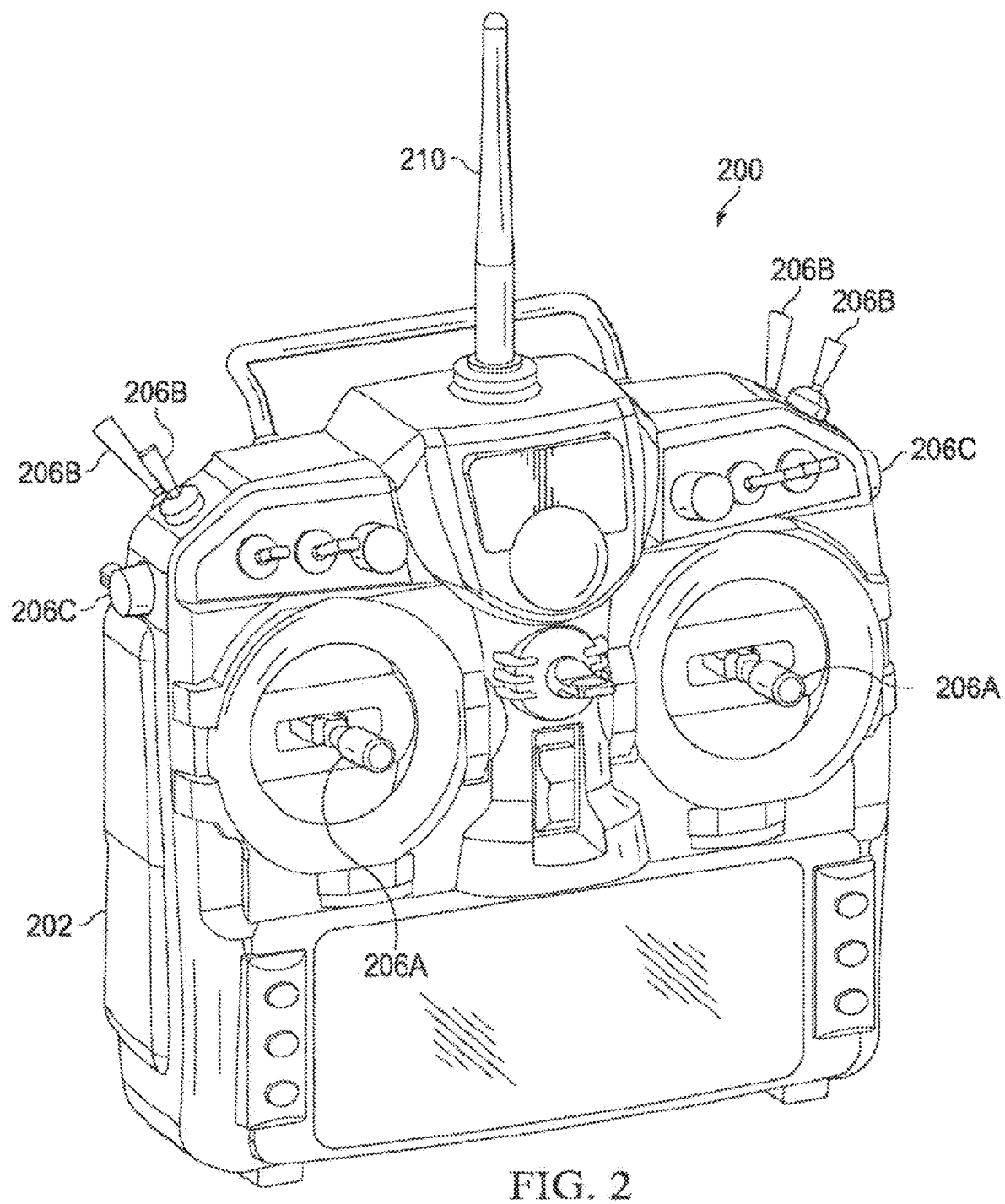
FIG. 2 illustrates a remote-control system for an aircraft that provides active feedback to a user in accordance with embodiments described herein.

FIG. 2 illustrates a remote-control system 200 that includes a remote-control unit 202 for enabling a user (e.g., a remote pilot) to control operation of a controlled aircraft, such as aircraft 100 (FIG. 1). In accordance with features described herein, and as will be described in greater detail below, remote control unit 202 is configured to provide active feedback regarding operation of a controlled aircraft to the user. In certain embodiments, remote control unit 202 is of a size appropriate to be held in one or both hands of the user and includes one or more controls 206, such as one or more joysticks 206A, switches 206B, and/or dials 206C for controlling operation of an aircraft. For example, the one or more joysticks 206A may be used to control an altitude, heading, and/or speed of an aircraft, whereas the one or more switches 206B may be used to control a mode of operation (e.g., autonomous flight vs. manual mode and/or forward flight vs. hover mode) of the aircraft. Additionally, depending on the flight mode, the joysticks 206A can be used to control ground speed and position. The switches 206B can be used for a multitude of ancillary tasks, such as lowering/raising landing gear, changing control gains of the flight control computer, turning on/off control surfaces in certain portions of the flight, and trigger certain maneuvers (e.g., return to home, loiter, etc.). It will be recognized that other controls, such as track balls, buttons, steering wheels, knobs, dials, trackballs, direction pads, and levers, for example, may be added to or substituted for the controls shown and described in FIG. 2.

Remote control unit 202 may include a wireless transmission device for transmitting control signals through the air to the aircraft in a manner that will be well known to those having ordinary skill in the art. The remote-control unit 202 may include an antenna 210 to broadcast radio frequency ("RF") or other frequency control signals at a desired frequency. Additionally, in accordance with features of embodiments described herein, remote control unit 202 includes appropriate receiver circuitry for receiving signals from the aircraft for purposes that will be described.

In accordance with features of embodiments described herein, and as will be described in greater detail below, remote control unit 202 includes embedded actuators that move the controls 206 and/or provide force feedback to the user in response to control signals transmitted wirelessly from the flight control system of the aircraft under control. As a result, the remote-control unit 202 provides to the user stick feel similar to that of manned aircraft to give the user better awareness of the state of the aircraft. Additionally, when the controlled aircraft is in autonomous flight mode, the controls are actuated as if a pilot were flying the aircraft. As a result, if the user/pilot needs to overtake control of the aircraft from the autonomous flight (or "auto-pilot"), there is no sudden "jump" in aircraft response, as the controls are already in positions that correspond to of the current state of the aircraft. Additionally, the system may be advantageously used in remote pilot training because it enables the pilot-in-training to feel how the sticks are being moved by the control system as it controls operation of the aircraft.

Figure 3A:
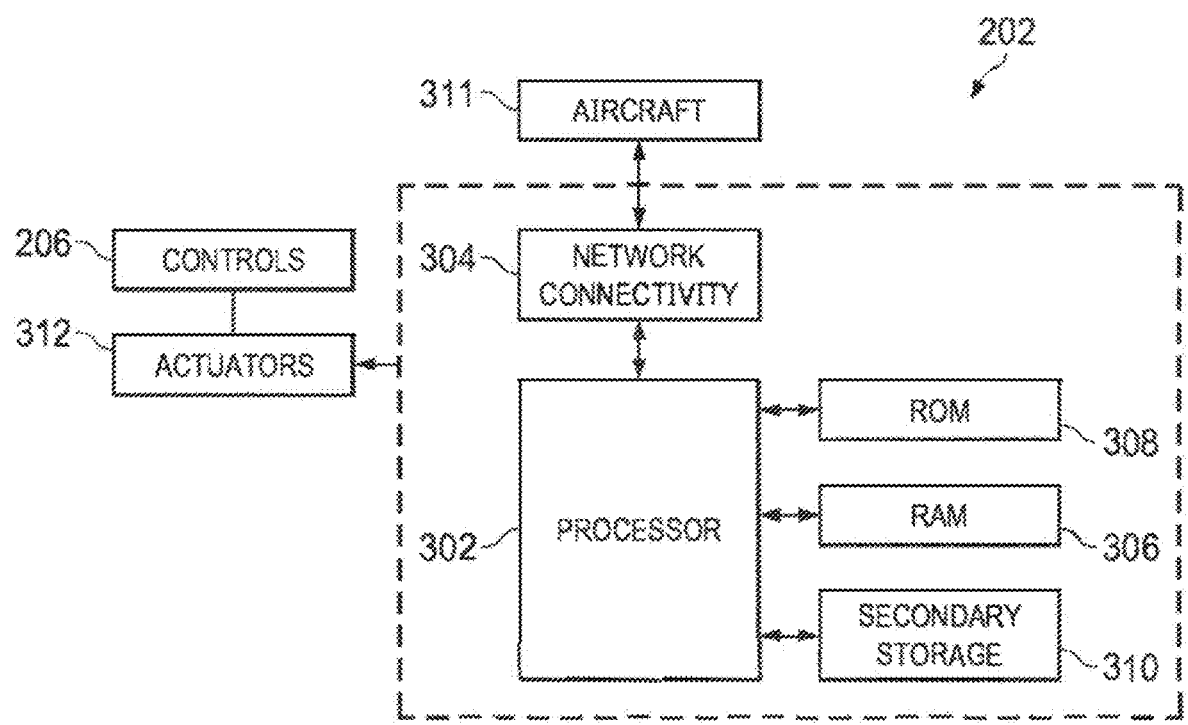
FIG. 3A is a schematic diagram of a remote-control unit suitable for implementing embodiments of this disclosure.

FIG. 3A is a schematic diagram of the remote-control unit 202 suitable for implementing embodiments described herein. As shown in FIG. 3A, the remote-control unit 202 includes a processing unit 300 suitable for implementing one or more embodiments disclosed herein. The processing unit 300 may include a processor 302 (which may be referred to as a central processor unit or CPU), network connectivity devices 304, random access memory ("RAM") 306, read only memory ("ROM") 308, and secondary storage 310. In some cases, some of these components may not be present or may be combined in various combinations with one another or with other components not shown. These components might be located in a single physical entity or in more than one physical entity. Any actions described herein as being taken by the processor 302 might be taken by the processor alone or by the processor in conjunction with one or more components shown or not shown in the system 300.

The processor 302 executes instructions, codes, computer programs, or scripts that it might access from the network connectivity devices 304, RAM 306, ROM 308, or secondary storage 310 (which might include various disk-based systems such as hard disk, floppy disk, optical disk, or other drive). While only one processor 302 is shown, multiple processors may be present. Thus, while instructions may be discussed as being executed by processor 302, the instructions may be executed simultaneously, serially, or otherwise by one or multiple processors. The processor 302 may be implemented as one or more CPU chips and/or application specific integrated chips (ASICs).

The network connectivity devices 304 may take the form of modems, modem banks, Ethernet devices, universal serial bus ("USB") interface devices, serial interfaces, token ring devices, fiber distributed data interface ("FDDI") devices, wireless local area network ("WLAN") devices, radio transceiver devices such as code division multiple access ("CDMA") devices, global system for mobile communications ("GSM") radio transceiver devices, worldwide interoperability for microwave access ("WiMAX") devices, and/or other well-known devices for connecting to networks. These network connectivity devices 304 may enable the processor 302 to communicate with the Internet or one or more telecommunications networks or other networks from which the processor might receive information or to which the processor might output information.

The network connectivity devices 304 might also include one or more transceiver components capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component might include separate receiving and transmitting units or a single transceiver. Information transmitted or received by the transceiver may include data that has been processed by the processor 302 or instructions that are to be executed by processor. Such information may be received from and outputted to a network in the form, for example, of a computer data baseband signal or signal embodied in a carrier wave. The data may be ordered according to different sequences as may be desirable for either processing or generating the data, transmitting or receiving the data, and/or controlling an aircraft 311. The baseband signal, the signal embedded in the carrier wave, or other types of signals currently used or hereafter developed may be referred to as the transmission medium and may be generated according to several methods well known to one skilled in the art.

RAM 306 might be used to store volatile data and perhaps to store instructions that are executed by the processor 302. ROM 308 is a non-volatile memory device that typically has a smaller memory capacity than the memory capacity of the secondary storage 310. ROM 308 might be used to store instructions and perhaps data that are read during execution of the instructions. Access to both RAM 306 and ROM 308 is typically faster than to secondary storage 310. The secondary storage 310 is typically comprised of one or more disk drives, tape drives, or solid-state drives and might be used for non-volatile storage of data or as an over-flow data storage device if RAM 306 is not large enough to hold all working data. Secondary storage 310 may be used to store programs or instructions that are loaded into RAM 306 when such programs are selected for execution or information is needed.

In accordance with features of embodiments described herein, processing system 300 processes control signals generated using controls 206 and transmits the control signals to a controlled aircraft 311 via network connectivity devices 304. Additionally processing unit 300 for processing control signals generated using controls 206 and transmitting the control signals to a controlled aircraft 311 via network connectivity devices 304. Additionally, and in accordance with embodiments described herein, remote-control unit 202 further receives via network connectivity devices 304 control signals transmitted wirelessly from the controlled aircraft 311, which control signals indicate an operational state and/or operational characteristics of the aircraft 311. For example, when the aircraft 311 is functioning in an autonomous flight mode, control signals may be provided from the aircraft 311 to the processing system 300 via network connectivity devices 304 of the remote-control unit 202 for indicating a state and/or mode of operation of the aircraft 311. Received control signals are processed by processing system 300, which generates control signals to one or more actuators 312 for controlling positions of controls 206 such that they directly correspond to and indicate an operational state and/or operational characteristics of the aircraft 311.

Figure 3B:
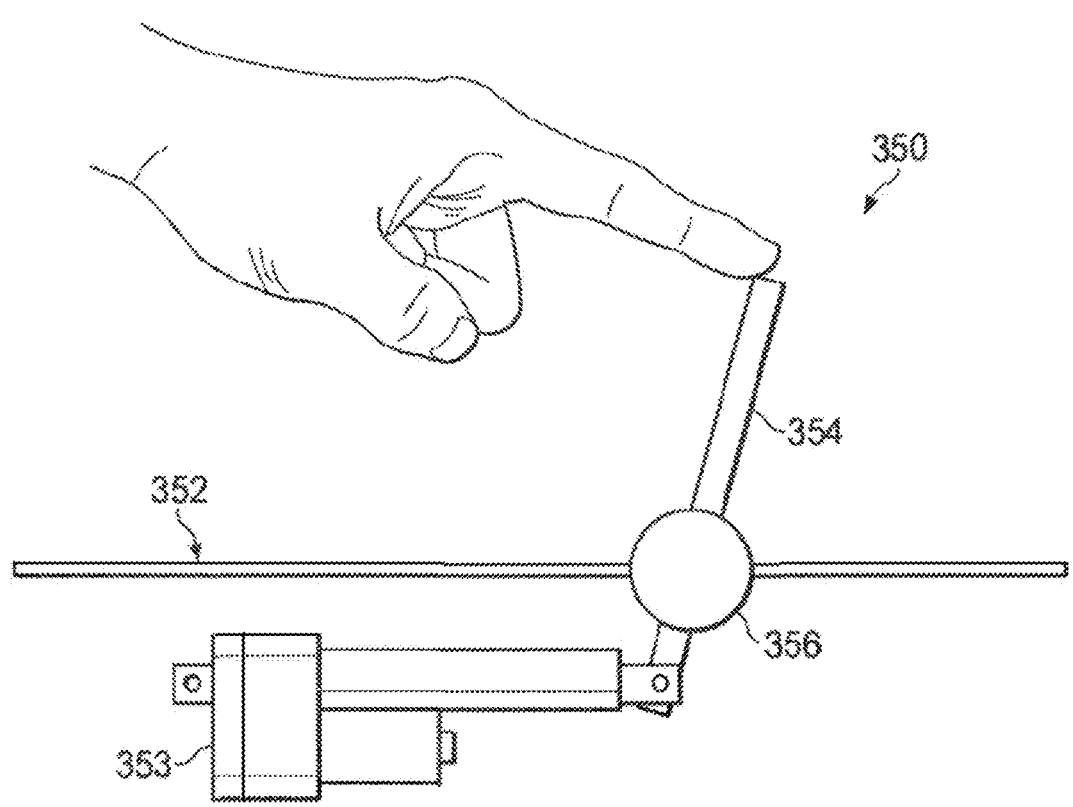
FIG. 3B illustrates an example actuation system for use in connection with a remote-control system for an aircraft that provides active feedback to a user in accordance with embodiments described herein.

FIG. 3B illustrates an example actuation system 350 for use in connection with a remote-control system 352 for an aircraft that provides active feedback to a user in accordance with embodiments described herein. As shown in FIG. 3B, the actuation system comprises an actuator 353, which is implemented as an electric linear actuator and is connected to a control, such as a joystick 354, via a lever pivot 356. In other embodiments, other types of actuators, including but not limited to an electric rotary actuator (or "servo"), a hydraulic actuator (rotary or linear), a pneumatic actuator (rotary or linear), a stepper motor, and/or an electric solenoid, for example. As previously noted, control signals from a processing system (not shown in FIG. 3B) to actuator 353 cause the actuator to control a position of the joystick 354 such that it directly corresponds to and indicates an operational state and/or operational characteristics of a controlled aircraft.

Figure 4:
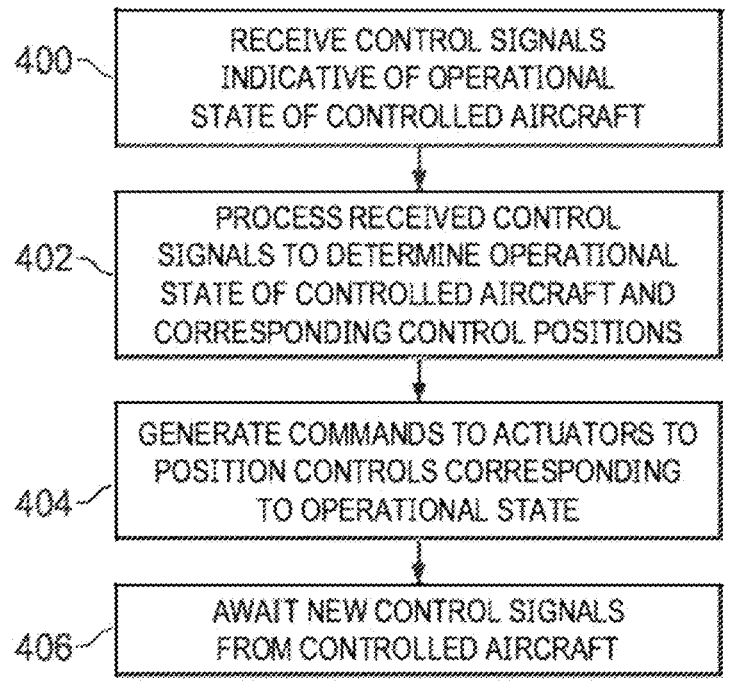
FIG. 4 is a flow diagram illustrating operation of a remote-control unit for providing active feedback in accordance with embodiments described herein.

FIG. 4 is a flow diagram illustrating operation of a remote-control unit for providing active feedback in accordance with embodiments described herein. Referring to FIG. 4, in step 400, the remote-control unit receives control signals indicative of an operational state of a controlled aircraft. In step 402, the received control signals are processed by the processing system of the remote-control unit to determine an operational state of the controlled aircraft, as well as corresponding positioning of controls. In step 404, the processing system generates commands to actuators to position the respective controls in manners corresponding to the operational state of the aircraft. In step 406, the remote-control unit awaits new control signals from the controlled aircraft.

Figure 5:
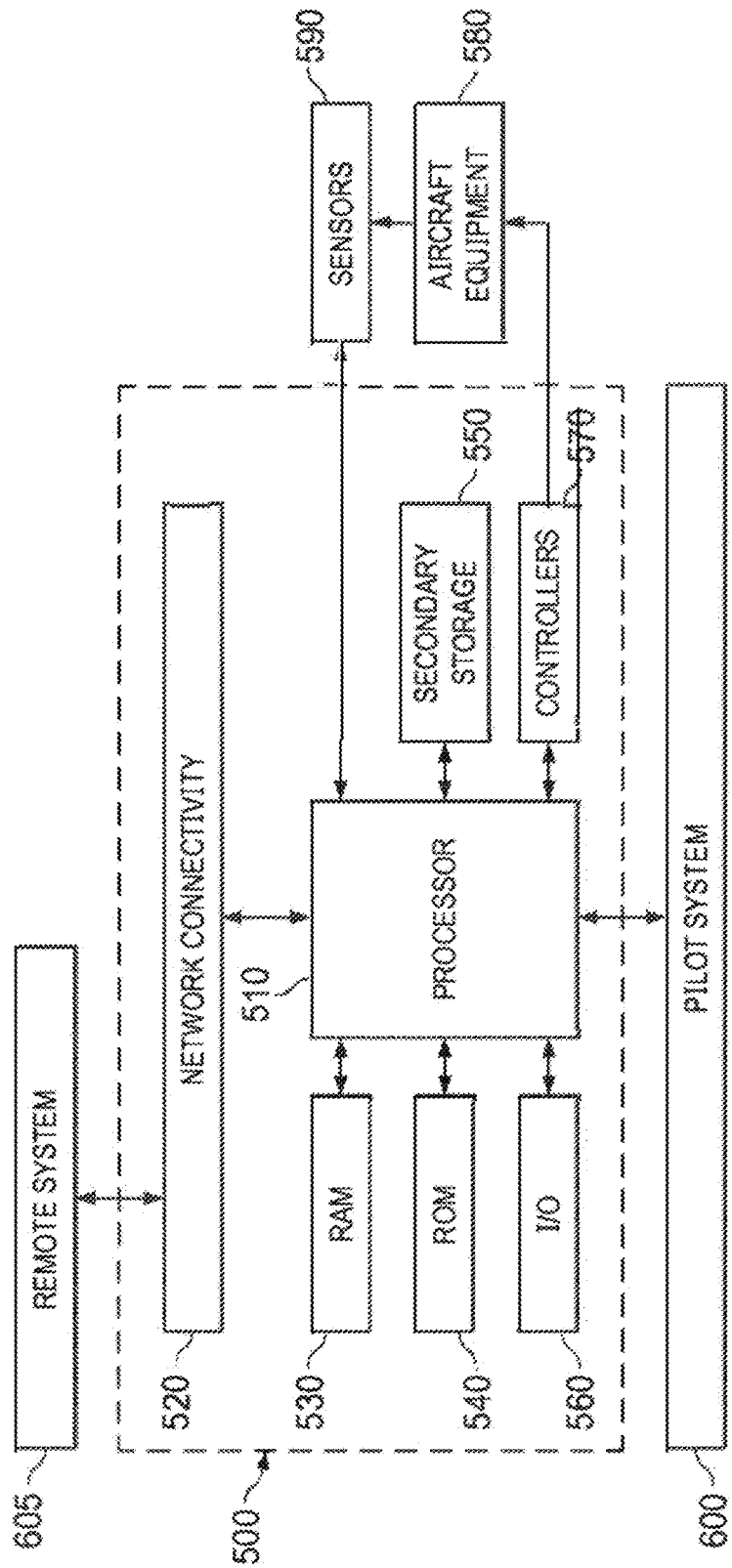
FIG. 5 is a schematic diagram of a general-purpose processor (e.g. electronic controller or computer) system suitable for implementing the embodiments of this disclosure.

FIG. 5 illustrates a schematic diagram of a general-purpose processor (e.g. electronic controller or computer) system 500 suitable for implementing the embodiments of this disclosure. System 500, which may be characterized as a flight control system, includes a processor 510 suitable for implementing one or more embodiments disclosed herein. In addition to the processor 510 (which may be referred to as a central processor unit or CPU), the system 500 may include network connectivity devices 520, random access memory ("RAM") 530, read only memory ("ROM") 540, secondary storage 550, and input/output (I/O) devices 560. System 500 may also comprise aircraft component controllers 570 for generating control signals to aircraft equipment 580 (e.g., propulsion assemblies and/or control assemblies including control surfaces) in accordance with the teachings of embodiments described herein. Sensors 590 are also provided and provide sensor data to be processed by processor 510. In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the system 500. It will be appreciated that the data and lookup tables described herein may be stored in memory (e.g., RAM 530, ROM 540) and/or in one or more databases comprising secondary storage 550.

The processor 510 executes instructions, codes, computer programs, or scripts that it might access from the network connectivity devices 520, RAM 530, ROM 540, or secondary storage 550 (which might include various disk-based systems such as hard disk, floppy disk, optical disk, or other drive). While only one processor 510 is shown, multiple processors may be present. Thus, while instructions may be discussed as being executed by processor 510, the instructions may be executed simultaneously, serially, or otherwise by one or multiple processors 510. The processor 510 may be implemented as one or more CPU chips and/or application specific integrated chips (ASICs).

The network connectivity devices 520 may take the form of modems, modem banks, Ethernet devices, universal serial bus ("USB") interface devices, serial interfaces, token ring devices, fiber distributed data interface ("FDDI") devices, wireless local area network ("WLAN") devices, radio transceiver devices such as code division multiple access ("CDMA") devices, global system for mobile communications ("GSM") radio transceiver devices, worldwide interoperability for microwave access ("WiMAX") devices, and/or other well-known devices for connecting to networks. These network connectivity devices 520 may enable the processor 510 to communicate with the Internet or one or more telecommunications networks or other networks from which the processor 510 might receive information or to which the processor 510 might output information.

The network connectivity devices 520 might also include one or more transceiver components capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component might include separate receiving and transmitting units or a single transceiver. Information transmitted or received by the transceiver may include data that has been processed by the processor 510 or instructions that are to be executed by processor 510. Such information may be received from and outputted to a network in the form, for example, of a computer data baseband signal or signal embodied in a carrier wave. The data may be ordered according to different sequences as may be desirable for either processing or generating the data, transmitting or receiving the data, and/or controlling the aircraft 100. The baseband signal, the signal embedded in the carrier wave, or other types of signals currently used or hereafter developed may be referred to as the transmission medium and may be generated according to several methods well known to one skilled in the art.

RAM 530 might be used to store volatile data and perhaps to store instructions that are executed by the processor 510. ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives, tape drives, or solid-state drives and might be used for non-volatile storage of data or as an over-flow data storage device if RAM 530 is not large enough to hold all working data. Secondary storage 550 may be used to store programs or instructions that are loaded into RAM 530 when such programs are selected for execution or information is needed.

The I/O devices 560 may include liquid crystal displays (LCDs), touchscreen displays, keyboards, keypads, switches, dials, mice, track balls, voice recognizers, card readers, paper tape readers, printers, video monitors, transducers, sensors 590, motor drive electronics, or other well-known input or output devices, such a cyclic control, collective control, and pedal inputs used by a pilot, co-pilot, or remote pilot. Also, the transceiver 525 might be considered to be a component of the I/O devices 560 instead of or in addition to being a component of the network connectivity devices 520. Some or all of the I/O devices 560 may be substantially similar to various components disclosed herein and/or may be components of any of the control systems and/or other electronic systems disclosed herein.

It is to be understood by those skilled in the art that system 500 may be implemented in a variety of forms including hardware, software, firmware, special purpose processors and combinations thereof, and may comprise an autonomous flight system. System 500 may receive input from a variety of sources including on-board sources such as sensors 590 and a pilot system 600, which in certain embodiments may comprise an autonomous pilot ("auto-pilot") system, as well as external sources such as a remote system 605, global positioning system satellites or other location positioning systems and the like. For example, system 500 may receive a flight plan including starting and ending locations for a mission from pilot system 600 and/or remote system 605 (which may include, for example, a remote-control unit, such as the remote-control unit 202). Thereafter system 500 is operable to autonomously control all aspects of flight of an aircraft of the present disclosure.

For example, during the various operating modes of aircraft 100 including vertical takeoff and landing mode, hover flight mode, forward flight mode, and transitions therebetween, commands are provided to controllers 570, which enable independent operation of each propulsion assembly including, for example, controlling the rotational speed of the rotors, changing the pitch of the rotor blades, adjusting the thrust vectors and the like. In addition, these commands enable transition of aircraft 100 between the vertical lift orientation and the forward thrust orientation. Feedback may be received from controllers 570 and each propulsion assembly 115. This feedback is processed by processor 510 and can be used to supply correction data and other information to controllers 570. Sensors 590, such as positioning sensors, attitude sensors, speed sensors, environmental sensors, fuel sensors, temperature sensors, location sensors and the like, also provide information to further enhance autonomous control capabilities.

Some or all of the autonomous control capability of system 500 can be augmented or supplanted by a remote flight control system, such as remote system 605. Remote system 605 may include one or computing systems that may be implemented on general-purpose computers, special purpose computers or other machines with memory and processing capability. For example, the computing systems may include one or more memory storage modules including, but is not limited to, internal storage memory such as random-access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet, or any other type of network that couples a plurality of computers to enable various modes of communication via network messages using as suitable communication techniques, such as transmission control protocol/internet protocol, file transfer protocol, hypertext transfer protocol, internet protocol security protocol, point-to-point tunneling protocol, secure sockets layer protocol or other suitable protocol. Remote system 605 may communicate with flight control system 500 via network connectivity devices 605 using include both wired and wireless connections.

Remote system 605 preferably includes one or more flight data display devices configured to display information relating to one or more aircraft of the present disclosure. Display devices may be configured in any suitable form, including, for example, liquid crystal displays, light emitting diode displays, cathode ray tube displays or any suitable type of display. Remote system 605 may also include audio output and input devices such as a microphone, speakers and/or an audio port allowing an operator to communicate with, for example, a pilot on board aircraft 100. The display device may also serve as a remote input device if a touch screen display implementation is used, however, other remote input devices, such as a keyboard or joysticks, may alternatively be used to allow an operator to provide control commands to an aircraft being operated responsive to remote control.

Some or all of the autonomous and/or remote flight control of an aircraft of the present disclosure can be augmented or supplanted by onboard pilot flight control from pilot system 600. Pilot system 600 may be integrated with system 500 or may be a standalone system preferably including a non-transitory computer readable storage medium including a set of computer instructions executable by a processor and may be implemented by a general-purpose computer, a special purpose computer or other machine with memory and processing capability. Pilot system 600 may include one or more memory storage modules including, but is not limited to, internal storage memory such as random-access memory, non-volatile memory such as read only memory, removable memory such as magnetic storage memory, optical storage memory, solid-state storage memory or other suitable memory storage entity. Pilot system 600 may be a microprocessor-based system operable to execute program code in the form of machine-executable instructions. In addition, pilot system 600 may be connectable to other computer systems via a proprietary encrypted network, a public encrypted network, the Internet or other suitable communication network that may include both wired and wireless connections. Pilot system 600 may communicate with system 500 via a communication channel that preferably includes a wired connection.

Figure 6:
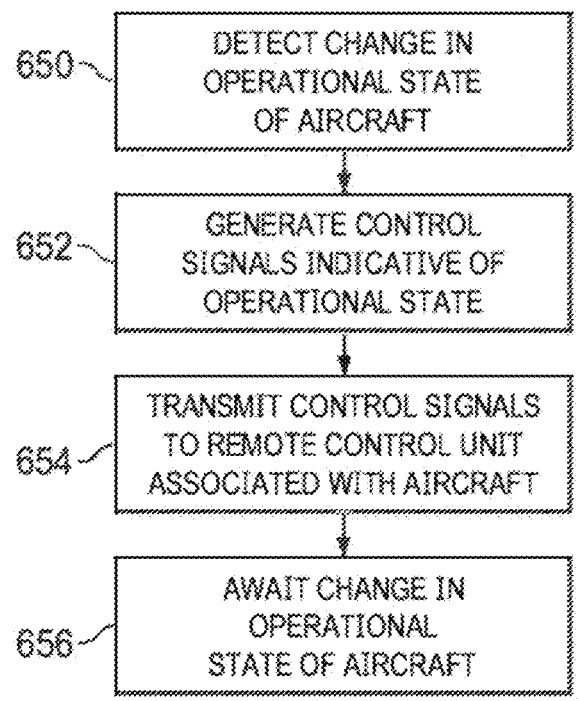
FIG. 6 is a flow diagram illustrating operation of an aircraft for providing active feedback in accordance with embodiments described herein.

FIG. 6 is a flow diagram illustrating operation of an aircraft controllable by a remote-control unit for providing active feedback in accordance with embodiments described herein. In step 650, a change in an operational state of the aircraft is detected. In step 652, control signals indicative of the detected change in operational state are generated and in step 654, the generated control signals are transmitted to a remote-control unit associated with the aircraft. In step 656, a next change in an operational state of the aircraft is awaited.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A remote control apparatus for operating a vehicle, the remote control apparatus comprising:
a receiver for receiving a first control signal indicative of an operational state of the vehicle;

a processor for processing the received first control signal to determine the operational state of the vehicle and for generating a second control signal;

at least one control element; and an actuator configured to receive the second control signal and to control a position of the at least one control element such that the position corresponds to and indicates to a human operator of the vehicle the operational state of the vehicle in accordance with the processing.

2. The remote control apparatus of claim 1, wherein the first control signal is received from an autonomous pilot system of the vehicle.

3. The remote control apparatus of claim 1, wherein the receiver is configured to receive a next control signal indicative of a Previously Presented operational state of the vehicle.

4. The remote control apparatus of claim 1, wherein the first control signal is generated by the vehicle in response to a change in the operational state of the vehicle.

5. The remote control apparatus of claim 1, wherein the at least one control element comprises at least one of a lever, a dial, and a joystick.

6. The remote control apparatus of claim 1, wherein the actuator comprises at least one of a linear actuator, a servo, a hydraulic actuator, a pneumatic actuator, a stepper motor, and an electric solenoid.

7. An unmanned aerial vehicle (UAV) for operation using a remote control unit, the remote control unit comprising a plurality of control elements for controlling operation of at least one aspect of the UAV when the UAV is in a remote control unit mode during which a human operator provides control information to the UAV using the plurality of control elements and at least one actuator connected to the control elements for controlling positions of the control elements when the UAV is in an autonomous operations mode during which the UAV operates without receiving control information from the human operator, the remote control unit comprising:

a receiver for receiving a first control signal from the UAV indicative of a state of operation of the UAV;

a processor for processing the received first control signal to determine the state of operation of the UAV and generating a second control signal to the at least one actuator to cause the at least one actuator to control the positions of the control elements such that they correspond to and indicate the state of operation of the UAV to the human operator.

8. The UAV of claim 7, wherein the control elements comprise a pair of joysticks.

9. The UAV of claim 7, wherein the control elements comprise a joystick and a switch.

10. The UAV of claim 7, wherein the control elements comprise a joystick and a dial.

11. The UAV of claim 7, wherein the at least one actuator comprises a linear actuator, a servo, a hydraulic actuator, a pneumatic actuator, a stepper motor, and an electric solenoid.

12. The UAV of claim 7, wherein the at least one actuator comprises a servo.

13. The UAV of claim 7, wherein the at least one actuator comprises a hydraulic actuator.

14. The UAV of claim 7, wherein the at least one actuator comprises a pneumatic actuator.

15. The UAV of claim 7, wherein the at least one actuator comprises a stepper motor.

16. The UAV of claim 7, wherein the at least one actuator comprises an electric solenoid.

17. A remote controller associated with a vehicle, the remote controller comprising a plurality of control elements for controlling operation of at least one aspect of the vehicle when the vehicle is in a remote control mode during which a human operator provides control information to the vehicle using the plurality of control elements and at least one actuator connected to the control elements for controlling positions of the control elements when the vehicle is in an autonomous operations mode during which the vehicle operates without receiving control information from the human operator, the remote controller comprising:

a receiver for receiving a first control signal from the vehicle indicative of an operational state of the vehicle;

a processor for processing the received first control signal to determine the operational state of the vehicle and generating a second control signal to the at least one actuator to cause the at least one actuator to control the positions of the control elements such that they correspond to and indicate the operational state of the vehicle to the human operator.

18. The remote controller of claim 17, wherein the first control signal is received from an autonomous pilot system of the vehicle.

19. The remote controller of claim 17, wherein the receiver receives a next control signal indicative of a new operational state of the vehicle.

20. The remote controller of claim 17, wherein the first control signal is generated by a control system of the vehicle in response to a change in the operational state of the vehicle.

* * * * *